(12) United States Patent
Boeuf et al.

(10) Patent No.: US 11,709,315 B2
(45) Date of Patent: Jul. 25, 2023

(54) INTEGRATED PHOTONIC DEVICE WITH IMPROVED OPTICAL COUPLING

(71) Applicant: STMicroelectronics (Crolles 2) SAS, Crolles (FR)

(72) Inventors: Frederic Boeuf, Le Versoud (FR); Charles Baudot, Lumbin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 17/540,626

(22) Filed: Dec. 2, 2021

(65) Prior Publication Data

US 2022/0091330 A1   Mar. 24, 2022

Related U.S. Application Data

(62) Division of application No. 16/847,189, filed on Apr. 13, 2020, now Pat. No. 11,231,548, which is a
(Continued)

(30) Foreign Application Priority Data

May 20, 2016   (FR) ...................... 1654523

(51) Int. Cl.
  *G02B 6/12*   (2006.01)
  *G02B 6/30*   (2006.01)
  (Continued)

(52) U.S. Cl.
  CPC ......... *G02B 6/12002* (2013.01); *G02B 6/122* (2013.01); *G02B 6/124* (2013.01);
  (Continued)

(58) Field of Classification Search
  CPC ................................... G02B 6/12; G02B 6/27
  (Continued)

(56) References Cited

U.S. PATENT DOCUMENTS 5,917,980 A * 6/1999 Yoshimura .............. G02F 1/065
                                                           385/132
6,661,942 B1 * 12/2003 Gharavi ............. G02B 6/12007
                                                           385/16
(Continued)

FOREIGN PATENT DOCUMENTS

EP   2198333 B1   7/2013
EP   3015888 A1   5/2016

OTHER PUBLICATIONS

INPI Search Report and Written Opinion for FR 1654523 dated Feb. 20, 2017 (8 pages).

*Primary Examiner* — Kaveh C Kianni
(74) *Attorney, Agent, or Firm* — Crowe & Dunlevy

(57) ABSTRACT

A three-dimensional photonic integrated structure includes a first semiconductor substrate and a second semiconductor substrate. The first substrate incorporates a first waveguide and the second semiconductor substrate incorporates a second waveguide. An intermediate region located between the two substrates is formed by a one dielectric layer. The second substrate further includes an optical coupler configured for receiving a light signal. The first substrate and dielectric layer form a reflective element located below and opposite the grating coupler in order to reflect at least one part of the light signal.

13 Claims, 2 Drawing Sheets

Related U.S. Application Data division of application No. 16/156,601, filed on Oct. 10, 2018, now Pat. No. 10,656,331, which is a division of application No. 15/377,848, filed on Dec. 13, 2016, now Pat. No. 10,126,497.

(51) Int. Cl.

| | | |
|---|---|---|
| *G02B 6/124* | (2006.01) | |
| *G02B 6/122* | (2006.01) | |
| *G02B 6/126* | (2006.01) | |
| *G02B 6/27* | (2006.01) | |
| *G02B 6/34* | (2006.01) | |
| *G02B 6/42* | (2006.01) | |

(52) U.S. Cl.
CPC ......... *G02B 6/12004* (2013.01); *G02B 6/126* (2013.01); *G02B 6/2773* (2013.01); *G02B 6/30* (2013.01); *G02B 6/34* (2013.01); *G02B 6/4204* (2013.01); *G02B 2006/12104* (2013.01); *G02B 2006/12107* (2013.01); *G02B 2006/12116* (2013.01); *G02B 2006/12147* (2013.01)

(58) Field of Classification Search
USPC .......................................................... 385/11
See application file for complete search history.

(56) References Cited

U.S. PATENT DOCUMENTS

| | | | | |
|---|---|---|---|---|
| 7,401,986 B2* | 7/2008 | Bhowmik | ............. | H01S 5/4062 372/50.21 |
| 7,409,327 B2* | 8/2008 | Deliwala | ............. | G02B 6/12004 716/136 |
| 8,165,437 B2* | 4/2012 | Pyo | ............. | G02B 6/124 385/37 |
| 8,213,751 B1* | 7/2012 | Ho | ............. | G02F 1/035 385/11 |
| 8,548,288 B2* | 10/2013 | Raj | ............. | G02B 6/12004 385/24 |
| 8,666,211 B2* | 3/2014 | Kopp | ............. | G02B 6/305 385/37 |
| 9,274,283 B1* | 3/2016 | Ellis-Monaghan | | G02B 6/12002 |
| 9,599,781 B1* | 3/2017 | Skogen | ............. | G02B 6/1226 |
| 9,739,971 B2* | 8/2017 | Eberle, Jr. | ............. | G02B 6/4471 |
| 9,772,447 B2* | 9/2017 | Keyvaninia | ............. | H01S 5/0215 |
| 9,791,639 B2* | 10/2017 | Zhao | ............. | G02B 6/3895 |
| 9,810,840 B2* | 11/2017 | Shi | ............. | G02B 6/1228 |
| 2002/0097962 A1* | 7/2002 | Yoshimura | ............. | G02B 6/124 385/16 |
| 2003/0003735 A1* | 1/2003 | Deliwala | ............. | G02B 6/12004 438/689 |
| 2004/0156589 A1* | 8/2004 | Gunn, III | ............. | G02B 6/12004 385/37 |
| 2006/0008207 A1 | 1/2006 | Gunn, III et al. | | |
| 2006/0120667 A1 | 6/2006 | Reed et al. | | |
| 2007/0086703 A1* | 4/2007 | Kirk | ............. | G02B 6/12007 385/24 |
| 2008/0002929 A1* | 1/2008 | Bowers | ............. | H01S 5/30 385/14 |
| 2009/0052827 A1* | 2/2009 | Durfee | ............. | G02F 1/035 385/2 |
| 2010/0202734 A1* | 8/2010 | DeCorby | ............. | G02B 6/1228 264/1.28 |
| 2011/0150386 A1* | 6/2011 | Dupuis | ............. | G02B 6/10 264/1.24 |
| 2011/0255824 A1* | 10/2011 | Lee | ............. | G02B 6/1228 264/1.25 |
| 2012/0270347 A1* | 10/2012 | Yagi | ............. | H01S 5/22 438/31 |
| 2012/0320939 A1* | 12/2012 | Baets | ............. | H01S 5/1032 372/45.01 |
| 2013/0015546 A1* | 1/2013 | Joe | ............. | G02B 6/12002 257/E31.127 |
| 2013/0016744 A1* | 1/2013 | Li | ............. | B82Y 20/00 372/20 |
| 2013/0121635 A1* | 5/2013 | Thacker | ............. | G02B 6/1228 29/428 |
| 2014/0376859 A1 | 12/2014 | Joe et al. | | |
| 2015/0177459 A1* | 6/2015 | Van Campenhout | .. | G02B 6/124 438/31 |
| 2015/0378185 A1* | 12/2015 | Shi | ............. | G02F 1/2257 438/69 |
| 2016/0124145 A1 | 5/2016 | Hassan et al. | | |
| 2016/0211645 A1* | 7/2016 | Padullaparthi | ............. | H01S 5/021 |
| 2016/0327759 A1* | 11/2016 | Keyvaninia | ............. | H01L 31/1035 |
| 2017/0192171 A1* | 7/2017 | Shi | ............. | G02B 6/1228 |
| 2017/0207603 A1* | 7/2017 | Evans | ............. | H01S 5/0085 |

* cited by examiner

INTEGRATED PHOTONIC DEVICE WITH IMPROVED OPTICAL COUPLING

CROSS REFERENCE TO RELATED APPLICATIONS

This application is a divisional of United States Application for patent Ser. No. 16/847,189 filed Apr. 13, 2020, which is a divisional of United States Application for patent Ser. No. 16/156,601 filed Oct. 10, 2018, now U.S. Pat. No. 10,656,331, which is a divisional of United States Application for patent Ser. No. 15/377,848 filed Dec. 13, 2016, now U.S. Pat. No. 10,126,497, which claims the priority benefit of French Application for Patent No. 1654523, filed on May 20, 2016, the disclosure of which is hereby incorporated by reference in its entirety.

TECHNICAL FIELD

Embodiments relate to photonic integrated devices, and notably to the coupling of this type of device with an external optical signal, coming from, for example, but not limited to, an optical fiber.

BACKGROUND

Conventionally, for coupling a photonic integrated circuit to an optical signal originating, for example, from an optical fiber, an optical coupler is implemented in the active layer of the integrated circuit for redirecting the light signal into a waveguide implemented in the structure.

During coupling, one part of the input optical signal passes through the coupler and is not transmitted in the waveguide. Means exist for improving the efficiency of the coupling, such as optimizing the thickness of the buried insulating layer in the case of a Silicon-On-Insulator (SOI according to the abbreviation well known to the person skilled in the art) substrate. However, even with an optimum thickness, a part of the signal is lost.

Another solution consists in placing a reflective layer, for example, a metal layer, under the buried layer, in order that the rays passing through the coupler are reflected and pass back again into the coupler. However, the production of such a metal layer requires specific method steps.

SUMMARY

Thus, according to one embodiment, provision is made here to further reduce the losses of an optical signal arriving at an integrated optical coupler.

In this respect, provision is advantageously made to use not a single integrated circuit but an integrated three-dimensional structure comprising multiple stacked substrates (forming a monolithic structure), and to implement a reflector in one of its substrates, under the optical coupler.

This has the advantage of limiting the optical signal losses and producing the reflector with existing manufacturing methods, such as etching and deposition of dielectric material.

According to one aspect, a three-dimensional photonic integrated structure is provided including a first semiconductor substrate incorporating at least one first waveguide, a second semiconductor substrate incorporating at least one second waveguide, and at least one intermediate region located between the two substrates and comprising at least one dielectric layer; the second substrate comprises at least one optical coupler configured for receiving a light signal, and the first substrate and said at least one dielectric layer comprising a reflective element located opposite said at least one optical coupler capable of reflecting at least one part of said light signal.

The reflective element comprises, for example, a portion of the first semiconductor substrate and a portion of said layer of dielectric material.

Thus, implementing the reflective element in a substrate comprising other photonic components avoids the need for a specific method step for obtaining the optical reflector.

According to one embodiment, the intermediate region may further comprise at least one additional semiconductor layer coated in the dielectric layer and located opposite the optical coupler, the reflective element further comprising said additional layer.

Preferably, the product of the thickness of the portion of the first semiconductor substrate and its refractive index and the product of the thickness of the portion of said layer of dielectric material and its refractive index are both approximately equal to a quarter of the wavelength of the light signal.

The first substrate and the second substrate may be semiconductor films located on insulating layers, thus forming silicon-on-insulator substrates. In this case, the intermediate region advantageously includes the buried insulating layer on which the second substrate is located.

According to one embodiment, at least one part of the reflective element, for example, said portion of the first substrate, has a thickness less than or equal to the thickness of the first substrate. Thus, said portion may be etched or left as it is.

In particular, the thickness of said portion of the first semiconductor substrate may correspond to the thickness of other photonic components implemented in the first semiconductor substrate.

The optical coupler may be of a single polarization type, and in this case be coupled to a single waveguide, or of a polarization splitting type and then be coupled to multiple waveguides.

BRIEF DESCRIPTION OF THE DRAWINGS

Other advantages and features of the invention will appear on examination of embodiments of the invention, in no way restrictive, and the accompanying drawings in which.

DETAILED DESCRIPTION

Figure 1:
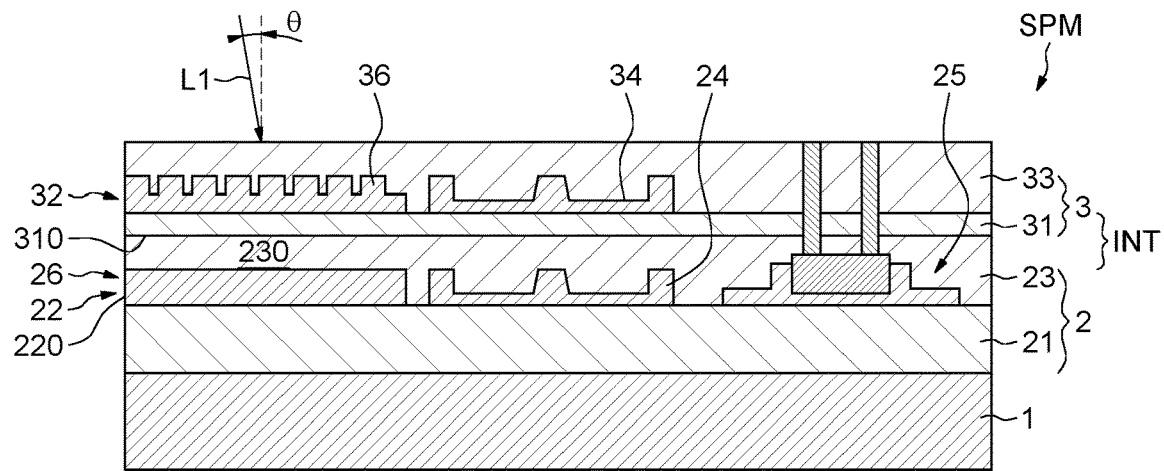
FIGS. 1, 3 and 4 illustrate a monolithic photonic structure.

FIG. 1 illustrates a monolithic photonic structure SPM. The photonic structure SPM comprises a carrier substrate 1, on which two silicon-on-insulator substrates 2 and 3 are implemented separated by an intermediate region INT and in which multiple photonic components are implemented.

The structure also comprises an interconnection region (BEOL, "Back End Of Line" according to the acronym well known to the person skilled in the art) not represented here for the purposes of simplification.

An optical fiber, for example, may be attached on the upper face of the structure SPM, delivering an incident optical signal L1 whereof the wavelength is, for example, close to one thousand three hundred and ten nanometers.

Here, the input optical signal arrives at the structure at a low angle θ, for example, between eight and thirteen degrees.

The first SOI substrate 2 comprises a first substrate proper, or semiconductor film 22, and a first buried insulating layer 21 (known by the person skilled in the art under the acronym "BOX", for Buried Oxide), here a layer of silicon dioxide conventionally having a thickness of seven hundred nanometers.

The first buried insulating layer 21 is located here under the first semiconductor film 22, having, for example, here a thickness of three hundred nanometers.

Multiple photonic components are implemented by etching in the first silicon film 22, then coated in a first layer of dielectric material 23, here of silicon dioxide, so that the assembly formed by the first silicon film 22 and the first dielectric layer 23 has a thickness of four hundred and fifty nanometers.

The first substrate 22 notably comprises a first waveguide 24 and a set of active components, including, for example, a photodetector 25.

The second SOI substrate 3, implemented directly above the layer of dielectric material 23 by molecular bonding, comprises a second buried insulating layer 31 of a thickness, for example, equal to one hundred nanometers, forming with the layer of dielectric material 23 the intermediate region INT, whereon the second substrate proper is located, or second semiconductor film 32, made of silicon, for example.

The second substrate 3 comprises photonic components etched in the second semiconductor film 32 and coated in a second layer of dielectric material 33. Here, the components notably comprise a second waveguide 34 optically coupled to an optical coupler 36 of a grating type.

The structure SPM also comprises a reflective element 26, here a Bragg mirror conventionally formed by multiple layers having different refractive indices.

In this example, the Bragg mirror 26 includes two stacked layers, including a first layer formed by one portion 220 of the first silicon film 22, and a second layer formed by the stacking of one portion 230 of the first dielectric layer 23 and one portion 310 of the second buried insulating layer 31 of the second substrate 3.

The thicknesses of the two layers of the Bragg mirror 26 are chosen here so that the product of the thickness of each layer and the refractive index of the material which composes it is as close as possible to a quarter of the wavelength of the incident signal L1. This feature makes it possible to further increase the efficiency of the mirror 26. However, this value is only indicative, and the result of the product may be adapted so as to be more or less close to this value according to the thickness of the first buried insulating layer 21.

Here, the thickness of the portion 220 of the first substrate 22 is the same as the thickness of the components of the first substrate, notably of the first waveguide 24 and the photodiode 25. Thus, the implementation of the Bragg mirror 26 does not require a specific method step.

It should be noted that the drawings presented here are simplified cross-sectional views. Thus, although the second waveguide 34 and the optical coupler 36 are represented in the same cross-sectional plane, they may in reality be located in separate planes and/or be oriented in different directions.

Figure 2:
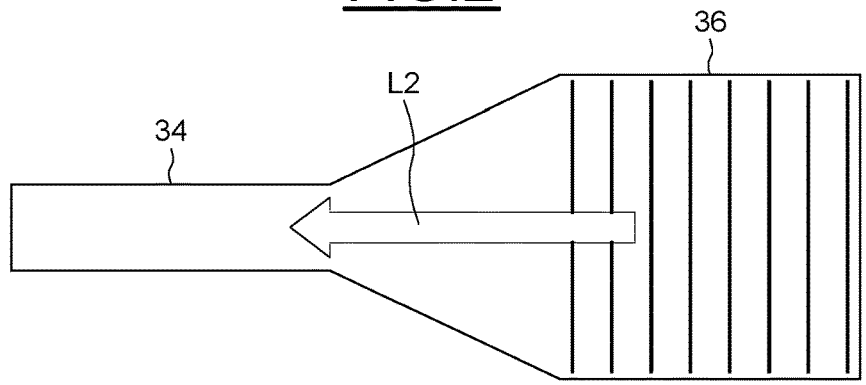
FIG. 2 shows a grating coupler as a single polarization coupler.

As illustrated in FIG. 2, the optical (grating) coupler 36 is a single polarization coupler, such that a light signal L2 coming from the coupler and entering the second waveguide 34 is polarized according to a single polarization state, for example here a transverse electric polarization, such that a polarization in which the electric field component of the light wave is perpendicular to the plane of incidence (also known to the person skilled in the art under the term "S polarization").

The optical (grating) coupler 36 is implemented above the Bragg mirror 26. Accordingly, a large part of the incident rays passing through the coupler 36 arrive at the mirror 26 in order to be reflected towards the coupler 36 and coupled to the waveguide 34. Thus, the signal losses due to the coupling are reduced. For a wavelength close to one thousand three hundred and ten (1,310) nanometers, such a mirror exhibits a reflectivity of 90%, for an incident wave L1 in transverse electric mode (TE, according to the abbreviation well known to the person skilled in the art), arriving at an angle θ of 13°.

The second waveguide 34 has a portion implemented above the first waveguide 24, and having the same dimensions. Thus, these two parallel portions of the first and second waveguides form an adiabatic coupler for transferring light from the second waveguide to the first waveguide.

Figure 3:
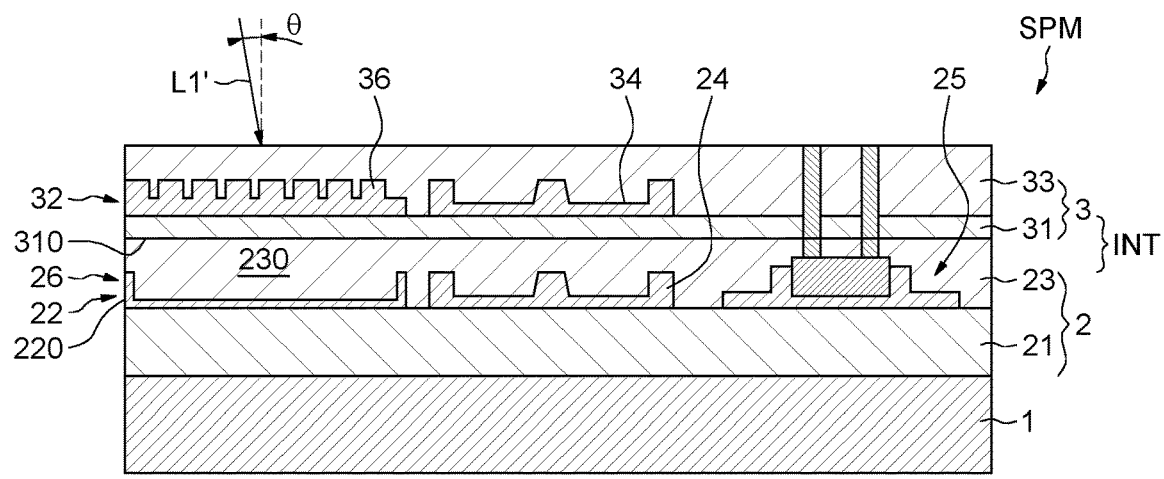

FIG. 3 illustrates an embodiment in which the first portion 220 of the first semiconductor film 22 has undergone an additional etching so as to make it less thick. This thickness may, for example, and advantageously, correspond to the thickness of silicon of some semiconductor portions of photonic components etched in the first semiconductor film 22, so that the same etching step may be used to form these photonic components and the Bragg mirror 26.

Thus, the Bragg mirror is here formed by the first portion 220 of the first silicon film 22 having in this example a thickness of one hundred and fifty nanometers, by the first portion 230 of the layer of dielectric material 23, therefore having a thickness of three hundred nanometers, and one portion 310 of the buried insulating layer 31 of the second substrate 3, of a thickness of one hundred nanometers.

Thus, the Bragg mirror is optimized for reflecting an incident signal L1' having here a wavelength close to one thousand five hundred and fifty (1,550) nanometers. For this wavelength, such a mirror exhibits a reflectivity of 80%, for an incident wave L1' in transverse electric mode, arriving at an angle θ of 13°.

Figure 4:
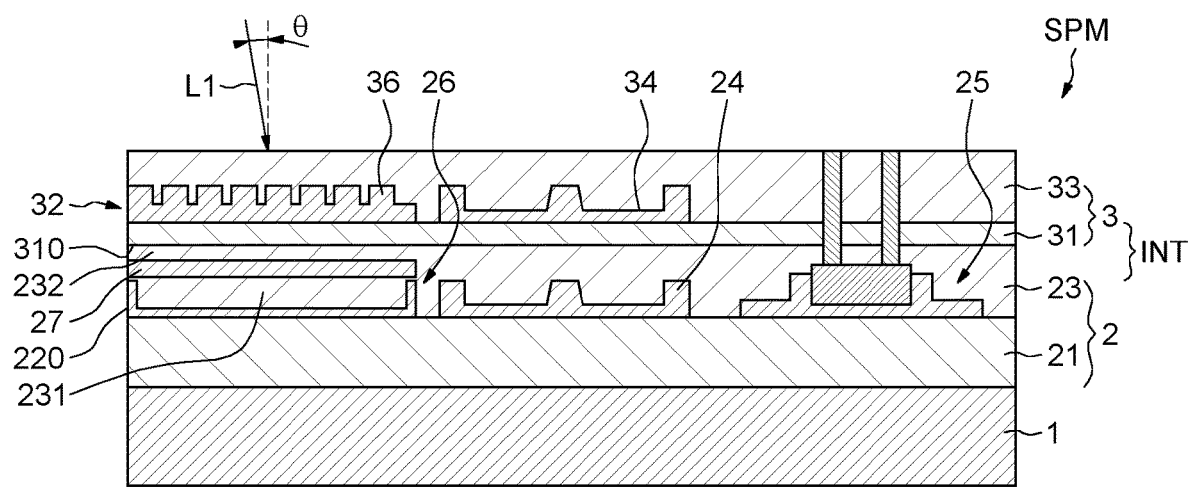

FIG. 4 illustrates that the intermediate region INT comprises an additional silicon layer 27, for example made of polycrystalline silicon or amorphous silicon, of a thickness of one hundred and fifty nanometers, implemented above the first silicon film 22 in order to further improve the reflectivity of the Bragg mirror 26.

Here, the portion 220 of the first silicon layer has been etched so as to have a thickness of one hundred and fifty nanometers. It has been covered with a first portion 231 of the first layer of dielectric material, 23, which has been leveled before the deposition and etching of the additional silicon layer 27, which has itself been covered with a second portion 232 of the first layer of dielectric material 23.

Thus, the Bragg mirror in this example comprises four layers:
the first portion 220 of the first silicon film 22, of a thickness of one hundred and fifty nanometers,
a first portion 231 of the first layer of dielectric material 23, here of a thickness of one hundred and fifty nanometers,
the additional silicon layer 27, and
the stack of a second portion 232 of the first layer of dielectric material 23, of a thickness of fifty nanometers and a portion 310 of the buried insulating layer 31 of the second substrate 3, of a thickness of one hundred nanometers.

Thus, it is particularly advantageous that the two thicknesses of the pairs of silicon and silicon dioxide layers are identical, which provides improved reflectivity. However, it would be conceivable to have a mirror with different thicknesses of layers.

Figure 5:
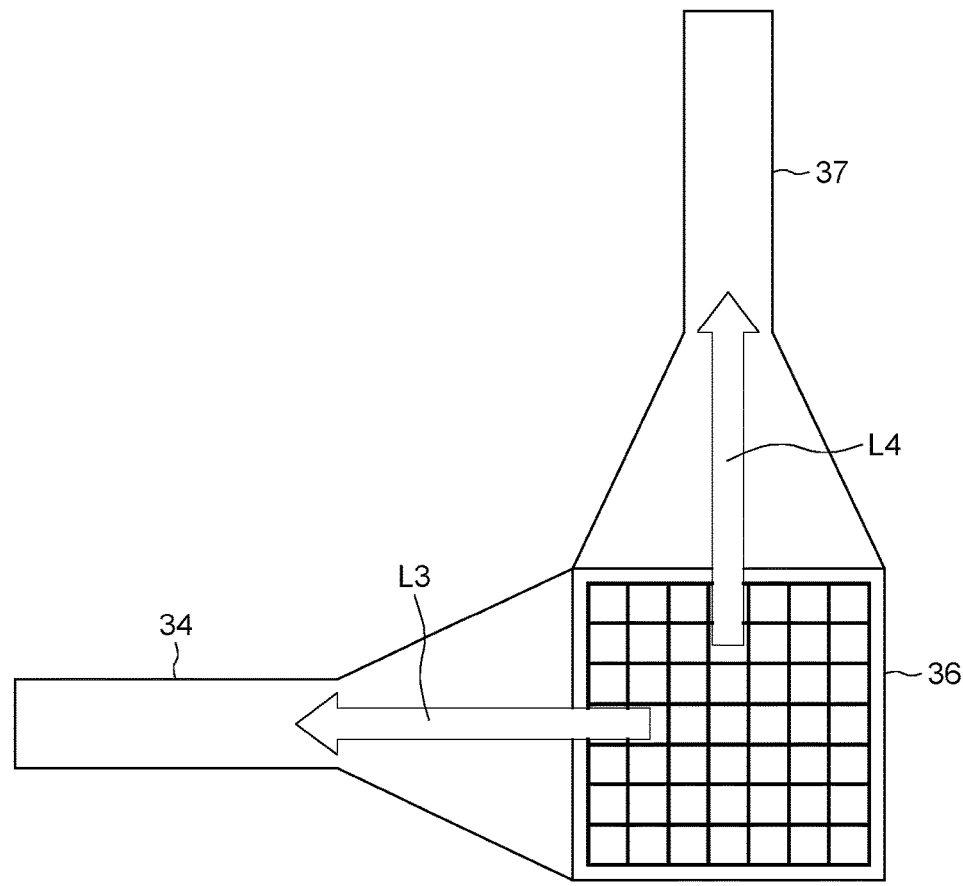
FIG. 5 shows a grating coupler as a polarization splitting coupler.

As illustrated in FIG. 5, the optical (grating) coupler is in this example a polarization splitting coupler (PSGC, for "Polarization Splitting Grating Coupler" according to the abbreviation well known to the person skilled in the art). Nevertheless, this embodiment is compatible with a single polarization coupler.

Thus, a light signal L1 passing into the coupler 36 will be split into two separate polarization subsignals. For example, a first subsignal L3 will here be transverse electrically polarized and directed into the second waveguide 34, and a second subsignal L4 will be directed into a third waveguide 37 and transverse magnetically polarized (or P polarization), meaning a polarization in which the magnetic field component of the light wave is perpendicular to the plane of incidence.

It should be noted that the embodiments described here are in no way restrictive. Notably, although a Bragg reflector with a thickness of five hundred and fifty nanometers has been described, it is quite possible to envisage a reflector having a different thickness, preferably but not restrictively with layers whereof the product of the thickness and the refractive index is close to a quarter of the wavelength of the incident signal. The same applies to the number of layers of the mirror, which may vary with respect to the examples illustrated in FIGS. 1, 3 and 4.

What is claimed is:

1. A three-dimensional photonic integrated structure, including:
   a first semiconductor substrate layer incorporating a first waveguide;
   a second semiconductor substrate layer incorporating a second waveguide;
   wherein the second semiconductor substrate layer comprises an optical coupler having a first side configured to receive a light signal; and
   an intermediate region located between the first and second semiconductor substrate layers and comprising at least one dielectric layer; and
   wherein the first semiconductor substrate layer and said at least one dielectric layer comprises a reflective element located below said optical coupler and opposite the first side of said optical coupler, the reflective element configured to reflect at least part of said light signal back towards said optical coupler;
   wherein the intermediate region further comprises an additional semiconductor layer coated by the at least one dielectric layer and located opposite the optical coupler, the reflective element further comprising said additional semiconductor layer.

2. The structure according to claim 1, wherein the reflective element comprises a portion of the first semiconductor substrate layer and a portion of said at least one dielectric layer.

3. The structure according to claim 2, where a product of a thickness of the portion of the first semiconductor substrate layer and its refractive index and a product of a thickness of the portion of said at least one dielectric material layer and its refractive index are both substantially equal to a quarter of a wavelength of the light signal.

4. The structure according to claim 2, wherein a thickness of said portion of the first semiconductor substrate layer corresponds to a thickness of said first waveguide implemented in the first semiconductor substrate layer.

5. The structure according to claim 2, wherein said portion of the first semiconductor substrate layer comprises, in cross-section, an edge portion having a first thickness and a central portion having a second thickness, wherein the second thickness is less than the first thickness.

6. The structure according to claim 5, wherein first waveguide has a thickness equal to said first thickness of the edge portion.

7. The structure according to claim 1, wherein the first semiconductor substrate layer and the second semiconductor substrate layer are each formed by a semiconductor film located on an insulating layer, and wherein the intermediate region includes the insulating layer on which the semiconductor film of the second semiconductor substrate layer is located.

8. The structure according to claim 1, wherein at least one part of the reflective element has a thickness less than or equal to a thickness of the first semiconductor substrate layer.

9. The structure according to claim 1, wherein the optical coupler is a single polarization grating coupler and is coupled to said second waveguide.

10. The structure according to claim 1, wherein the optical coupler is a polarization splitting grating coupler coupled to said at least one second waveguide.

11. The structure according to claim 1, wherein said additional semiconductor layer extends over the first semiconductor substrate layer for said reflector and is positioned between the optical coupler and the reflective element.

12. The structure according to claim 11, further comprising a portion of said at least one dielectric layer positioned between a bottom of said additional semiconductor layer and the first semiconductor substrate layer for said reflector.

13. The structure according to claim 1, further comprising an insulating layer covering the optical coupler and the second waveguide.

\* \* \* \* \*